US012266067B2

(12) United States Patent
Evangelista et al.

(10) Patent No.: US 12,266,067 B2
(45) Date of Patent: Apr. 1, 2025

(54) VIRTUAL AVATARS AND PHYSICAL OBJECT INTERACTION BASED ON PROXIMITY IN AUGMENTED REALITY APPLICATIONS

(71) Applicant: Samsung Electronics Co., Ltd., Suwon-si (KR)

(72) Inventors: Edgar Evangelista, San Jose, CA (US); Jaehyun Kim, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 17/646,265

(22) Filed: Dec. 28, 2021

(65) Prior Publication Data
US 2022/0383601 A1    Dec. 1, 2022

Related U.S. Application Data

(60) Provisional application No. 63/192,915, filed on May 25, 2021.

(51) Int. Cl.
 *G06T 19/20*  (2011.01)
 *G06T 13/40*  (2011.01)
 *G06T 19/00*  (2011.01)

(52) U.S. Cl.
 CPC .............. *G06T 19/20* (2013.01); *G06T 13/40* (2013.01); *G06T 19/006* (2013.01); *G06T 2219/008* (2013.01); *G06T 2219/2004* (2013.01)

(58) Field of Classification Search
 CPC ....... G06T 19/20; G06T 13/40; G06T 19/006; G06T 2219/008; G06T 2219/2004; G06F 3/011; G06F 3/015; G06F 3/017
 See application file for complete search history.

(56) References Cited

U.S. PATENT DOCUMENTS 6,416,327 B1 * 7/2002 Wittenbecher ..... A63B 69/3614
                                                   434/247
9,286,725 B2    3/2016 Vasquez, II et al.
(Continued)

FOREIGN PATENT DOCUMENTS

CN    109254671 A    1/2019
CN    110941416 A    3/2020

OTHER PUBLICATIONS

Du et al., "DepthLab: Real-time 3D Interaction with Depth Maps for Mobile Augmented Reality", Session 12A: Space and Depth for Interaction in VR, UIST'20, Oct. 20-23, 2020, Virtual Event, USA, 15 pages.

(Continued)

*Primary Examiner* — David D Davis

(57) ABSTRACT

A method, an electronic device and computer readable medium for augmented reality object interaction. The method includes identifying an object within an area and properties associated with the object. The method also includes transmitting, to a remote electronic device, object information associated with the object. The method further includes receiving, from the remote electronic device, information including a virtual object, representing a remote user. Additionally, the method includes displaying the virtual object within the area. In response to determining that the virtual object is within a threshold distance from the object, the method also includes modifying the virtual object to interact with the object based on the properties of the object.

20 Claims, 11 Drawing Sheets

(56) References Cited

U.S. PATENT DOCUMENTS

| | | | |
|---|---|---|---|
| 9,367,136 B2* | 6/2016 | Latta | G06F 3/017 |
| 9,626,801 B2 | 4/2017 | Mullins | |
| 9,767,606 B2 | 9/2017 | Kapinos et al. | |
| 10,013,805 B2 | 7/2018 | Barzuza et al. | |
| 10,366,538 B2 | 7/2019 | Meier et al. | |
| 10,665,036 B1* | 5/2020 | Ha | G02B 27/017 |
| 10,726,631 B1* | 7/2020 | Ha | G06T 7/73 |
| 10,846,902 B2 | 11/2020 | Reeves et al. | |
| 10,946,278 B2 | 3/2021 | Turner et al. | |
| 11,630,633 B1* | 4/2023 | MacDougall | G06F 3/011 |
| | | | 715/204 |
| 11,631,065 B1* | 4/2023 | Unrau | G06Q 20/10 |
| | | | 705/39 |
| 2010/0164953 A1* | 7/2010 | Wouhaybi | A63F 13/20 |
| | | | 715/852 |
| 2013/0328762 A1* | 12/2013 | McCulloch | G06F 3/017 |
| | | | 345/156 |
| 2014/0002493 A1* | 1/2014 | Mitchell | A63F 13/00 |
| | | | 345/633 |
| 2015/0227210 A1* | 8/2015 | Chen | G06F 3/0346 |
| | | | 345/156 |
| 2019/0188895 A1* | 6/2019 | Miller, IV | G06F 3/017 |
| 2019/0318543 A1* | 10/2019 | Skidmore | G06T 15/20 |
| 2020/0298112 A1* | 9/2020 | Fish | A63F 13/332 |
| 2020/0379627 A1* | 12/2020 | Reynolds | G06F 3/04847 |
| 2021/0097875 A1* | 4/2021 | Alexander, IV | G06F 3/017 |
| 2021/0104100 A1* | 4/2021 | Whitney | G06F 3/011 |
| 2021/0375049 A1* | 12/2021 | Syed | G06F 3/04815 |
| 2023/0090253 A1* | 3/2023 | Meadows | G06T 13/40 |
| | | | 345/419 |

OTHER PUBLICATIONS

Montero et al., "Desiging and implementing interactive and realistic augmented reality experiences", Univ Access Inf Soc (2019) 18:49-61, Nov. 6, 2017, 13 pages.

Nuernberger et al., "SnapToReality: Aligning Augmented Reality to the Real World", CHI '16 Proceedings of the 2016 CHI Conference on Human Factors in Computing Systems, May 2016, 12 pages.

* cited by examiner

VIRTUAL AVATARS AND PHYSICAL OBJECT INTERACTION BASED ON PROXIMITY IN AUGMENTED REALITY APPLICATIONS

CROSS-REFERENCE TO RELATED APPLICATION AND CLAIM OF PRIORITY

This application claims priority under 35 U.S.C. § 119(e) to U.S. Provisional Patent Application No. 63/192,915 filed on May 25, 2021. The above-identified provisional patent applications is hereby incorporated by reference in its entirety.

TECHNICAL FIELD

This disclosure relates generally to imaging and visualization systems. More specifically, this disclosure relates to virtual avatars and physical object interaction in augmented reality applications.

BACKGROUND

Augmented reality (AR) and virtual reality (VR) are emerging as new ways of experiencing immersive video due to the ready availability of powerful handheld devices such as smartphones. The AR and VR experiences provide immersive "real life," "being there" experience for consumers. For example, during a AR or VR call a first user can interact with and view another user or an avatar that represents the other user.

SUMMARY

This disclosure provides virtual avatars and physical object interaction in augmented reality applications.

In a first embodiment, a method includes identifying an object within an area and properties associated with the object. The method also includes transmitting, to a remote electronic device, object information associated with the object. The method further includes receiving, from the remote electronic device, information including a virtual object, representing a remote user. Additionally, the method includes displaying the virtual object within the area. The method also includes that in response to determining that the virtual object is within a threshold distance from the object, modifying the virtual object to interact with the object based on the properties of the object.

In a second embodiment, an electronic device includes a communication interface and a processor. The processor is configured to identify an object within an area and properties associated with the object. The processor is also configured to transmit, to a remote electronic device, object information associated with the object. The processor is further configured to receive, from the remote electronic device, information including a virtual object, representing a remote user. Additionally, the processor is configured to display the virtual object within the area. In response to determining that the virtual object is within a threshold distance from the object, the processor is configured to modify the virtual object to interact with the object based on the properties of the object.

In a third embodiment, a non-transitory machine-readable medium contains instructions that, when executed, cause at least one processor of an electronic device to identify an object within an area and properties associated with the object. The medium also contains instructions that, when executed, cause the at least one processor to transmit, to a remote electronic device, object information associated with the object. The medium further contains instructions that, when executed, cause the at least one processor to receive, from the remote electronic device, information including a virtual object, representing a remote user. Additionally, the medium contains instructions that, when executed, cause the at least one processor to display the virtual object within the area. In response to determining that the virtual object is within a threshold distance from the object, the medium contains instructions that, when executed, cause the at least one processor to modify the virtual object to interact with the object based on the properties of the object.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
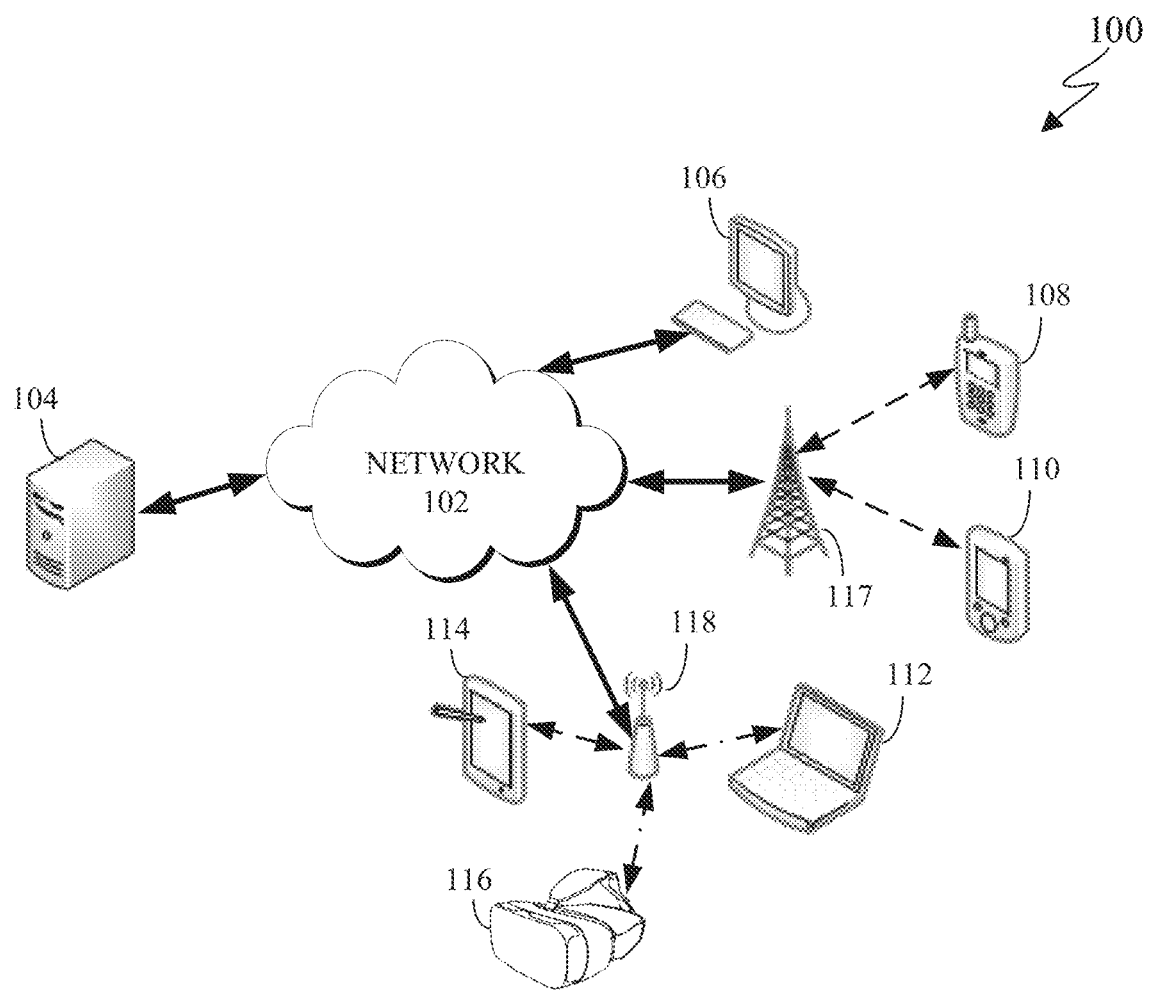
FIG. 1 illustrates an example communication system in accordance with an embodiment of this disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of the present disclosure, can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality/augmented reality headset (such as a head mounted display, glasses, and the like), a portable game console, a camera, and a wearable device, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

Virtual reality (VR) is a fully rendered version of a visual scene, where the entire scene is computer generated. Augmented reality (AR) is an interactive experience of a real-world environment where objects that reside in the real-world environment are augmented with virtual objects, virtual information, or both. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to detected head movements of a user. At the video level, VR is achieved by providing a video experience that covers as much of the field of view (FOV) as possible together with the synchronization of the viewing angle of the rendered video with the head movements. In an AR environment, a user both perceives the real world and is provided with additional computer generated information that enhances or modifies a user's perception of the real world.

Many different types of devices are able to provide the immersive experience associated with AR or VR. One example device is a head-mounted display (HMD). An HMD represents one of many types of devices that provide AR and VR experiences to a user. An HMD is a device that enables a user to view the VR scene and adjust the displayed content based on movements of the head of the user. Typically, an HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same.

Another example of a device that provide the immersive experience associated with AR is AR glasses (also referred to as smart glasses, wearable computer glasses, and the like). AR glasses include transparent display screen (such as a transparent heads up display) that provides both a view of the physical world and the ability to display virtual objects or information for the user to view. Certain AR glasses include sensors and processors that modify the virtual objects based on movements of the user and the objects of the real world.

For yet another example of a device that provide the immersive experience associated with AR is an electronic device with both a camera and a display. The camera can capture images of the real world, such as the environment around the electronic device. The captured images are then displayed on the display along with one or more added virtual objects or information for the user to view. As discussed above, various other electronic devices can provide both VR and AR environments for a user.

Multi-user applications (such as communications, games, word productivity, and the like), can provide platforms for two or more users to interact in an AR environment. One of the users is denoted as the user (or viewer) and located at one location while the other user(s) are denoted as remote user(s) and located at one or more different locations. An AR environment enables the viewer, via an electronic device, to both view their environment and a virtual object. Certain three dimensional (3D) spatial rendering systems and applications enable a remote user to control a virtual object in the space of another user. In certain embodiments, the remote object is a virtual avatar, which is a graphical representation of the remote user. For example, an avatar, representing a remote user can be displayed in the AR environment of the viewer. That is, the viewer in an AR environment, can view a virtual object (such as an avatar) that is controlled by a remote user within their real environment. The remote user can control the movement, position, gestures, and the like of their avatar in an AR environment for another user to view and interact with. However, the remote user may be unaware of the physical objects at the location of the viewer. As such, while the remote user controls the avatar, the avatar could be positioned at least partially in a wall (such as illustrated in FIG. 6C) or within furniture (such as illustrated in FIG. 7D) that is located at the viewers location. As such, the avatar can intersect and overlap real world objects in the viewers location, causing a break in the augmented reality experience as well as can provide improper communication between the remote user, that is represented as the avatar, and the viewer.

Certain embodiments of the present disclosure provide for a situation in which a remote user, while controlling a virtual object at the location of the viewer in an AR environment, is unaware of the location of the physical objects at the viewers location and their corresponding properties. Certain embodiments of the present disclosure also or in the alternative provide for a situation, when a virtual object that is controlled by a remote user, intersects a real world object (also referred to as a physical object), the virtual object impairs the AR environment of the viewer.

Therefore, embodiments of the present disclosure provide systems and methods for recognizing real world objects at the location of the viewer. Based on the recognized real world objects and properties associated with the objects, certain embodiments enable the virtual object to meaningfully interact with the real-world object. Embodiments of the present disclosure also provide to the remote user the approximate location of a real world object relative to the virtual object and the information associated with the real world objects, for enabling the remote user to interact with the real world object. The remote user can then move the avatar to a new location or alter the pose of their avatar. Embodiments of the present disclosure further provide systems and methods that modify the pose or location of the avatar with or without receiving a direction from the remote user for interacting with the real world objects. The modifications can include altering the pose of the virtual object, adding shadows around the real world object based on the location of the virtual object, adding sound when virtual object interacts with the real world object, and the like.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a head-mounted display (HMD), virtual assistant, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102.

Each client device 106-116 represents any suitable computing or processing device that interacts with at least one server (such as the server 104) or other computing device(s) over the network 102. In this example, the client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display an AR environment or a VR environment.

In this example, some client devices 108-116 communicate indirectly with the network 102. For example, the client devices 108 and 110 (mobile device 108 and PDA 110, respectively) communicate via one or more base stations 117, such as cellular base stations or eNodeBs (eNBs). Also, the laptop computer 112, the tablet computer 114, and the HMD 116 communicate via one or more wireless access points 118, such as IEEE 802.11 wireless access points. Note that these are for illustration only and that each client device 106-116 could communicate directly with the network 102 or indirectly with the network 102 via any suitable intermediate device(s) or network(s).

In some embodiments, any of the client devices 106-116 transmits information securely and efficiently to another device, such as, for example, the server 104. Also, any of the client devices 106-116 can trigger the information transmission between itself and server 104. Any of the client devices 106-114 can function as an AR or VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this document can be used, these features could be used in any other suitable system.

Figure 2:
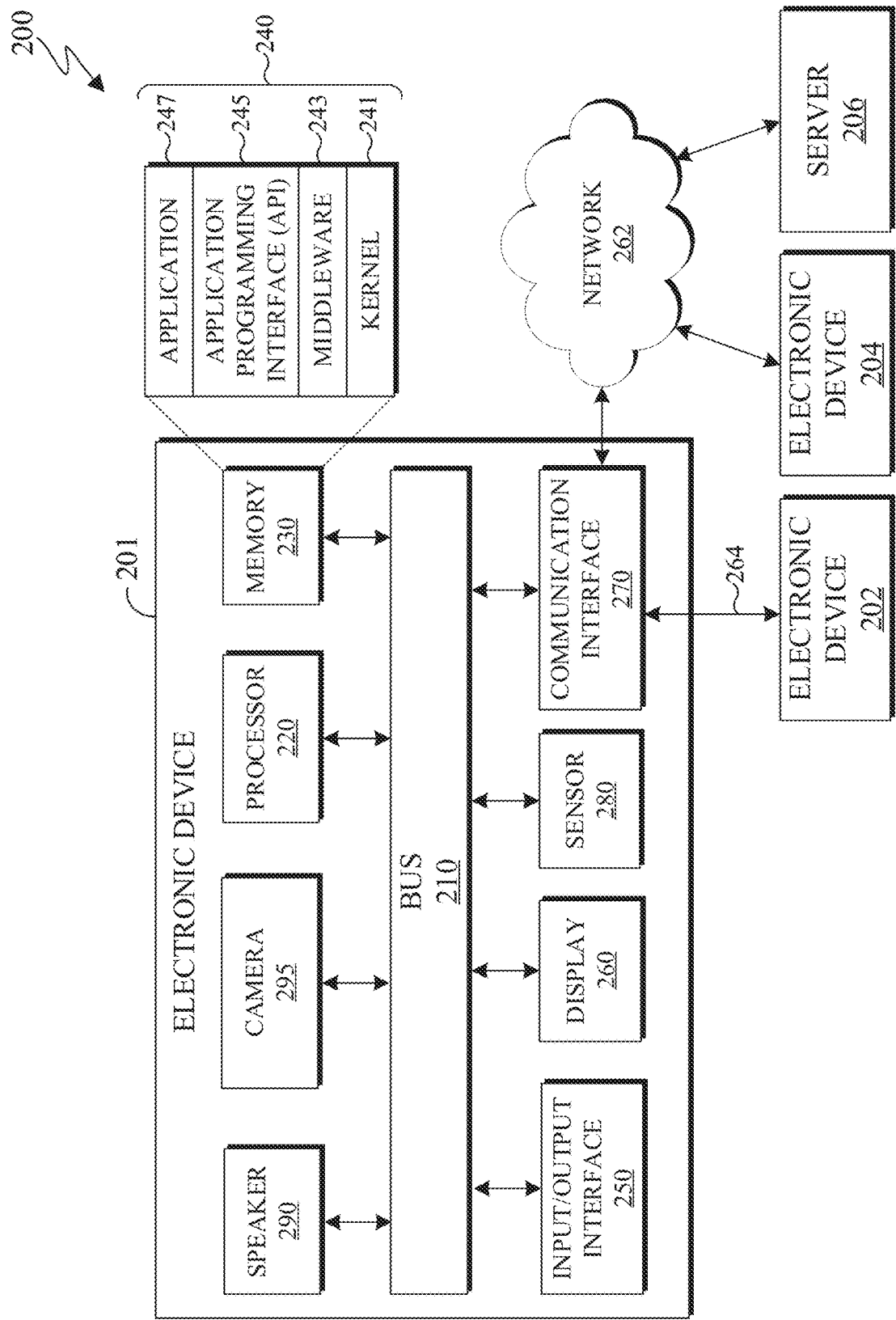
FIG. 2 illustrates an example network configuration including electronic devices in accordance with this disclosure.

FIG. 2 illustrates an example network configuration 200 including electronic devices in accordance with this disclosure. The embodiment of the network configuration 200 shown in FIG. 2 is for illustration only. Other embodiments of the network configuration 200 could be used without departing from the scope of this disclosure.

According to embodiments of this disclosure, an electronic device 201 is included in the network configuration 200. The electronic device 201 can be similar to any of the client devices 106-116 of FIG. 1. In certain embodiments, the electronic device 201 for rendering an AR environment for a viewer. The electronic device 201 can include at least one of a bus 210, a processor 220, a memory 230, an input/output (I/O) interface 250, a display 260, a communication interface 270, one or more sensors 280, a speaker 290, and a camera 295. In some embodiments, the electronic device 201 may exclude at least one of these components or may add at least one other component. The bus 210 includes a circuit for connecting the components 220-295 with one another and for transferring communications (such as control messages and/or data) between the components.

The processor 220 includes one or more of a central processing unit (CPU), a graphics processor unit (GPU), an application processor (AP), or a communication processor (CP). The processor 220 is able to perform control on at least one of the other components of the electronic device 201 and/or perform an operation or data processing relating to communication. In certain embodiments, the processor 220 identifies a physical object in the real world and properties of the physical object, such as whether the object is hard or soft. In certain embodiments, the processor 220 modifies virtual objects that are rendered in the AR environment based on the properties associated with the identified object.

The memory 230 can include a volatile and/or non-volatile memory. For example, the memory 230 can store commands or data related to at least one other component of the electronic device 201. According to embodiments of this disclosure, the memory 230 can store software and/or a program 240. The program 240 includes, for example, a kernel 241, middleware 243, an application programming interface (API) 245, and/or an application program (or "application") 247. At least a portion of the kernel 241, middleware 243, or API 245 may be denoted as an operating system (OS).

The kernel 241 can control or manage system resources (such as the bus 210, processor 220, or memory 230) used to perform operations or functions implemented in other programs (such as the middleware 243, API 245, or application 247). The kernel 241 provides an interface that allows the middleware 243, the API 245, or the application 247 to access the individual components of the electronic device 201 to control or manage the system resources. The application 247 includes one or more applications for object detection and recognition as discussed below. These functions can be performed by a single application or by multiple applications in which each carries out one or more of these functions. The middleware 243 can function as a relay to allow the API 245 or the application 247 to communicate data with the kernel 241, for instance. A plurality of applications 247 can be provided. The middleware 243 is able to control work requests received from the applications 247, such as by allocating the priority of using the system resources of the electronic device 201 (like the bus 210, the processor 220, or the memory 230) to at least one of the plurality of applications 247. The API 245 is an interface allowing the application 247 to control functions provided from the kernel 241 or the middleware 243. For example, the API 245 includes at least one interface or function (such as a command) for filing control, window control, image processing, or text control.

The I/O interface 250 serves as an interface that can, for example, transfer commands or data input from a user or other external devices to other component(s) of the electronic device 201. The I/O interface 250 can also output commands or data received from other component(s) of the electronic device 201 to the user or the other external device.

The display 260 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 260 can also be a depth-aware display, such as a multi-focal display. The display 260 is able to display, for example, various contents (such as text, images, videos, icons, or symbols) to the user. The display 260 can include a touchscreen and may receive, for example, a touch, gesture, proximity, or hovering input using an electronic pen or a body portion of the user. The display 260 can be a transparent display or a heads up display, to enable the viewer to both view the real world and virtual objects at similar times.

The communication interface 270, for example, is able to set up communication between the electronic device 201 and an external electronic device (such as an electronic device 202, a second electronic device 204, or a server 206). For example, the communication interface 270 can be connected with a network 262 or 264 through wireless or wired communication to communicate with the external electronic device. The communication interface 270 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 262 or 264 includes at least one communication network, such as a computer network (like a local area network (LAN) or wide area network (WAN)), Internet, or a telephone network.

The electronic device 201 further includes one or more sensors 280 that can meter a physical quantity or detect an activation state of the electronic device 201 and convert metered or detected information into an electrical signal. For example, one or more sensors 280 can include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 280 can further include an inertial measurement unit, which can include one or more accelerometers, gyroscopes, and other components. In addition, the sensor(s) 280 can include a control circuit for controlling at least one of the sensors included here. Any of these sensor(s) 280 can be located within the electronic device 201.

The electronic device 201 further includes one or more speakers 290 that convert electrical signals into sound. The electronic device 201 can also include a microphone similar to a dynamic microphone, a condenser microphone, a piezoelectric microphone, or the like.

Additionally, the electronic device 201 includes one or more cameras 295, or other imaging sensors, for capturing images or video of the environment. The camera 295 is able to view an environment and generating a sequence of images of video of the environment. The camera 295 can include one or more of a color camera (such as an RGB camera), a video camera, a depth camera, a motion sensor, radar, sonar, infrared (IR), and the like.

The external electronic device 202 and the external electronic device 204 can be similar to any of the client devices 106-116 of FIG. 1. The server 206 can be similar to the server 104 of FIG. 1. According to certain embodiments of this disclosure, the server 206 includes a group of one or more servers. The external electronic devices 202 and 204 and the server 206 each can be a device of the same or a different type from the electronic device 201.

According to certain embodiments of this disclosure, all or some of the operations executed on the electronic device 201 can be executed on another or multiple other electronic devices (such as the electronic devices 202 and 204 or server 206). Further, according to certain embodiments of this disclosure, when the electronic device 201 should perform some function or service automatically or at a request, the electronic device 201, instead of executing the function or service on its own or additionally, can request another device (such as electronic devices 202 and 204 or server 206) to perform at least some functions associated therewith. The other electronic device (such as electronic devices 202 and 204 or server 206) is able to execute the requested functions or additional functions and transfer a result of the execution to the electronic device 201. The electronic device 201 can provide a requested function or service by processing the received result as it is or additionally. To that end, a cloud computing, distributed computing, or client-server computing technique may be used, for example. While FIG. 2 shows that the electronic device 201 includes the communication interface 270 to communicate with the external electronic device 204 or server 206 via the network 262 or 264, the electronic device 201 may be independently operated without a separate communication function according to some embodiments of this disclosure.

The external electronic devices 202 and 204 can include the same or similar components 210-295 as the electronic device 201 (or a suitable subset thereof). Additionally, the external electronic devices 202 and 204 can be a wearable device or an electronic device-mountable wearable device (such as an HMD). When the electronic device 201 is mounted in the electronic device 202 (such as the HMD), the electronic device 201 can communicate with the electronic device 202 through the communication interface 270. The electronic device 201 can be directly connected with the electronic device 202 to communicate with the electronic device 202 without involving with a separate network. In certain embodiments, the external electronic devices 202 and 204 can be used by a remote user to control a virtual object that is displayed on the electronic device 201.

The server 206 can support to drive the electronic device 201 by performing at least one of operations (or functions) implemented on the electronic device 201. For example, the server 206 can include a processing module or processor that may support the processor 220 implemented in the electronic device 201. In certain embodiments, the server 206 performs the object recognition based on images or video captured by the camera 295.

Although FIG. 2 illustrates one example of a network configuration 200 including an electronic device 201, various changes may be made to FIG. 2. For example, the network configuration 200 could include any number of each component in any suitable arrangement. In general, computing and communication systems come in a wide variety of configurations, and FIG. 2 does not limit the scope of this disclosure to any particular configuration. Also, while FIG. 2 illustrates one operational environment in which various features disclosed in this document can be used, these features could be used in any other suitable system.

Figure 3:
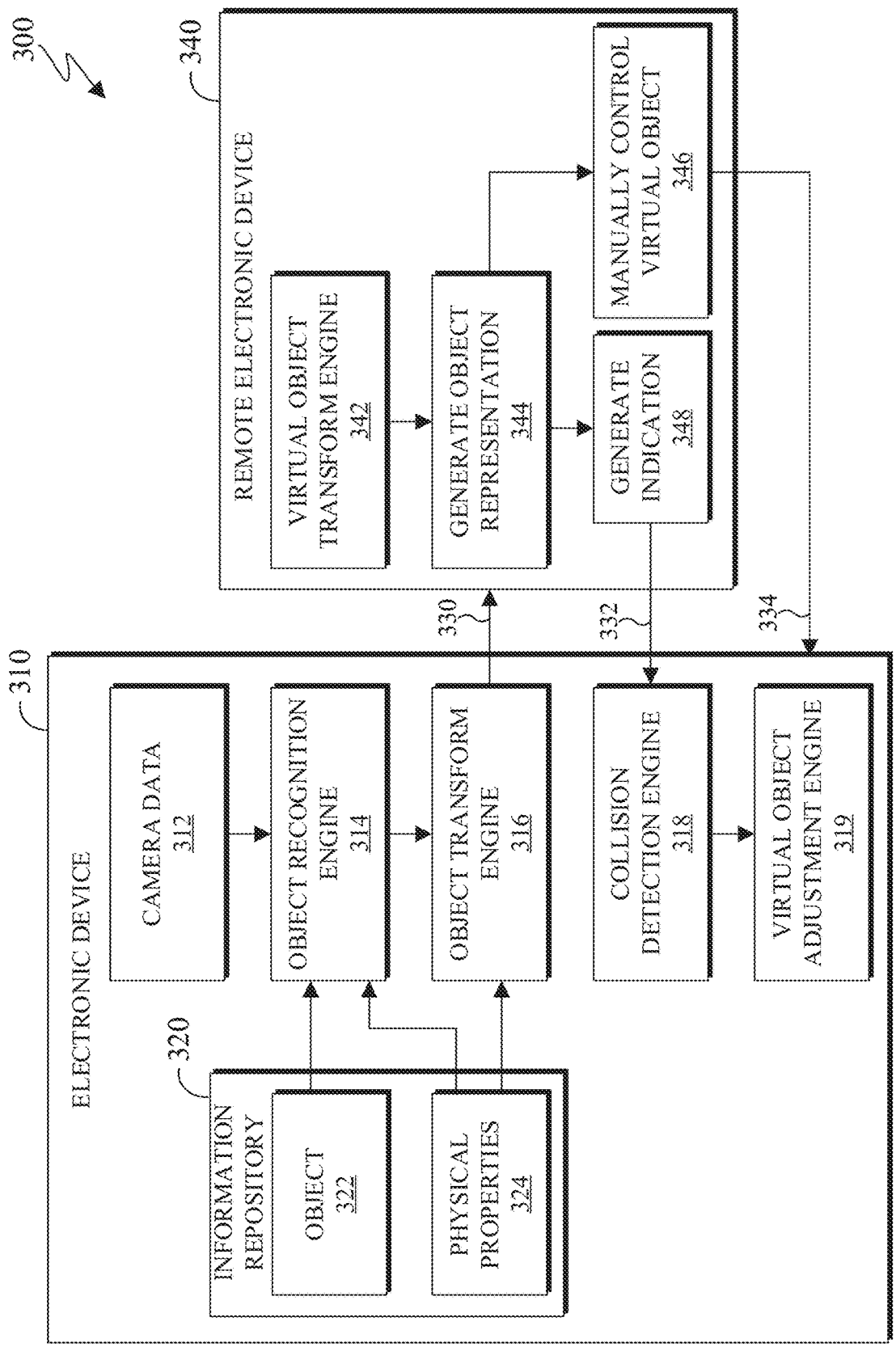
FIG. 3 illustrates a block diagram of a communication system for object interaction between a virtual object and a physical object in an augmented reality environment in accordance with this disclosure.

FIG. 3 illustrates a block diagram of a communication system 300 for object interaction between a virtual object and a physical object in an AR environment in accordance with this disclosure. The communication system 300 may be implemented in one of the client devices 106-116 or the server 104 of FIG. 1, the electronic device 201 or the server 206 of FIG. 2, or any combination thereof.

The communication system 300 includes an electronic device 310 and a remote electronic device 340. The electronic device 310 can be the same as or similar to the electronic device 201 while the remote electronic device 340 can be similar to the electronic device 202 or 204 of FIG. 2. The embodiment of the communication system 300 shown in FIG. 3 is for illustration only. Other embodiments can be used without departing from the scope of the present disclosure.

In certain embodiments, the electronic device 310 and the remote electronic device 340 are in communication such as via a network 102 of FIG. 1. For example, the electronic device 310 and the remote electronic device 340 can be using a video conference application such that the electronic device 310 displays a virtual representation of a remote user. In this example, the viewer of the electronic device 310 can view in an AR environment both their physical environment and with the addition of a virtual object, such as an avatar, representing the user of the remote electronic device 340.

The electronic device 310 includes an information repository 320. The information repository 320 includes object information 322 and physical property information 324. The object information 322 is used for object recognition. For example, the electronic device 310 can identify a category or type of a physical object based on the object information 322. The physical property information 324 includes various properties associated with an object such as whether the object is hard, soft, dense, possess an ability to absorb a force, elasticity, and the like.

In certain embodiments, a user can manually augment the information repository 320. For example, the user can add objects to the object information 322 and physical property information 324 based on the physical objects at their location. For example, the user can capture an image of various physical objects and provide a description of the object and various physical properties associated with the object. In certain embodiments, the user can also modify existing objects and properties within the information repository 320.

In certain embodiments, the properties can be accessed by other users who have similar objects. For example, the information repository can be maintained in a remote server and accessed by various devices for object recognition. In certain embodiments, the information repository 320 also stores collider information.

The electronic device 310 obtains camera data 312. The camera data 312 can be captured from the camera 295 of FIG. 2. The camera data 312 includes a video or images of the physical location (environment) around the electronic device 310. The camera data can include physical objects such as walls, furniture, and other real world physical objects.

As illustrated, the object recognition engine 314 is performed on the electronic device 310. In certain embodiments, the object recognition engine 314 is performed remotely such as on a server 104.

In certain embodiments, the object recognition engine 314 uses machine learning to identify an object. The object recognition engine 314 can also use computer vision when identifying an object. The object recognition engine 314 can identify the object type and volume (size) of the object. In certain embodiments, the object recognition engine 314 recognizes the real world objects in their space using data from the information repository 320. For example, if the camera data 312 includes an object, such as a sofa, the object recognition engine 314 can identify that the object is a sofa based on object information 322. In certain embodiments, the object recognition engine 314 compares the detected object to various objects in the object information 322 in order to identify or categorize the object.

In certain embodiments, the object recognition engine 314 also identifies properties associated with an object such as whether the object is hard, soft, dense, ability to absorb a force, elasticity and the like. The virtual object could interact with an object according to the identified properties to increase the immersion of the AR environment. For example, a virtual object, such as an avatar, sitting on a hard wooden chair would appear differently than a virtual object sitting on a plush sofa.

After determining that the physical object is a sofa, the object recognition engine 314 parses the physical properties information 324 to identify various physical properties associated with a sofa. For example, the object recognition engine 314 can determine that the sofa is soft and deformable.

The electronic device 310 can generate collision primitives around an identified object. The collision primitives provide an indication to the viewer, or to the remote user, regarding the size of the physical object. In certain embodiments, a partial collision primitive is generated when the object is partially covered by another object. The collision primitives can be a shape such as planes, prisms or spheres that is formed around a physical object. FIGS. 6B and 7B illustrate example collision primitives.

After identifying the object and its properties, the object transform engine 316 identifies the relative position of the object relative to the viewer and the virtual object representing the remote user. The object transform engine 316 can also identify an approximate volume of the object.

The information 330 associated with the object is then transmitted to the remote electronic device 340. The information 330 can include the location of the object, the size of the object, a type of object, and properties of the object. The information 330 can also include the collision primitives. In certain embodiments, the information 330 includes spatial volumetric information about the object, to enable the remote user knowledge about the physical environment in proximity of the viewer, the virtual object, or both.

The remote electronic device 340 receives the information 330 from the electronic device 310. The avatar transform engine 342 controls the position of the virtual object relative to the physical objects or the viewer. For example, if there is a spatial reference point, such as an anchor point, the virtual object can be initially positioned at a location relative to the anchor point. In this example, the virtual object is initially positioned at a location relative to a physical object at the location of the viewer.

The object representation engine 344 provides an indication to the remote user as to the location of the one or more physical objects. In certain embodiments, if the remote electronic device 340 includes a display (similar to the display 260 of FIG. 2), the object representation engine 344 displays the physical object at a location relative to the virtual object. For example, the object representation engine 344 generates and renders, on a display, some representation of the physical object at a position that is relative to the virtual object as perceived by the viewer. By displaying a representation of the physical object to the remote user, the object representation engine 344 enables the remote user to have a spatial understanding of the physical objects at the viewers location. FIG. 7C illustrates a view of the remote user with a virtual object representing the physical object at the viewers location, while FIG. 7D illustrates a view of what the viewer observes at of a virtual object that is overlapping a physical object at the viewers location.

Once the remote user knows of the positions of the physical objects relative to the position of the virtual object at the viewers location, the remote user can either manually control the virtual object 346 or generate an indication 348. The remote user can then manually control the virtual object 346 by moving the virtual object to a new location to avoid or interact with known physical objects. For example, the remote user can position the virtual object at a location in the viewers location that does not overlap with the physical objects of the viewer. In another example, the remote user can alter the position of the virtual object. That is, if the virtual object is an avatar that is positioned on or near a chair, the remote user can modify the avatar from a standing position to a seated position in the chair. Instructing the avatar to sit in the chair provides an element of authenticity to the augmented reality that the avatar is actually in the location of the viewer. The remote electronic device 340 transmits the instructions 334 for manually controlling the virtual object to the electronic device 310.

The remote user can select a displayed primitive, representing a physical object at the viewers location. The remote electronic device 340 can then display a notification. The notification specifies one or more actions, which can be performed by the avatar, for the remote user to select. Upon the remote user selecting a particular action, the remote electronic device 340 transmits the instructions 334 to manually control the virtual object to the electronic device 310 to perform the selected action.

In certain embodiments, the remote electronic device 340 can generate an indication 348. The indication 348 can be generated in response to the remote electronic device 340 receiving an input from the remote user. The indication 348 notifies the electronic device 310 to modify the virtual object. For example, the indication 348 instructs the electronic device 310 to modify the virtual object if the virtual object and a physical object at the location of the viewer overlap or collide. The remote electronic device 340 transmits the information 332 including the generated indication 348 to the electronic device 310.

The collision detection engine 318 of the electronic device 310 detects a collision between the virtual object and a physical object. For example, based on the location of the virtual object at the location of the viewer and the physical object at the location of the viewer, the collision detection engine 318 identifies whether the two objects overlap. When the two objects (the virtual object and the physical objects)

overlap, such as when the virtual object moves to overlap or collide with a physical object (or is within a predefined threshold distance), and the indication included in the information 332 is received, the virtual object adjustment engine 319 modifies the virtual object.

In certain embodiments, the modification includes moving the virtual object to a new location within the AR environment that does not overlap a physical object. In certain embodiments, the modification includes altering the pose of the virtual object to interact with the physical object. For example, if the physical object is identified as a wall and the virtual object is an avatar, the virtual object adjustment engine 319 can modify the pose of the avatar to lean against the wall. In another example, if the physical object is identified as a chair and the virtual object is an avatar, the virtual object adjustment engine 319 can modify the pose of the avatar to sit in the chair.

In certain embodiments, the modification includes providing overlays over the real object for indicating a realistic interaction. The overlap can include a shadow. For example, if the avatar leans against a wall, the shadow can be generated along the wall. In another example, if the avatar sits in a chair, the overlay can include shadows on the seat of the chair or the pillows. The overlay also can modify the appearance of the physical object. For example, if the avatar sits in a plush sofa, the virtual object adjustment engine 319 can generate an overlay representing that the avatar descends slightly into the sofa.

In certain embodiments, the modification includes generating an appropriate audio effect based on the interaction. For example, if the avatar leans against a wall, a "thud" sound can be generated based on the properties of the wall specifying that the wall is hard. In another example, if the avatar sits in a plush sofa, a different sound can be generated indicating that the descends slightly into the sofa.

Although FIG. 3 illustrates one example of the communication system 300, various changes may be made to FIG. 3. For example, the communication system 300 can receive various types of virtual objects, identify various types of physical objects, and alter a pose or position of a virtual object.

Figure 4:
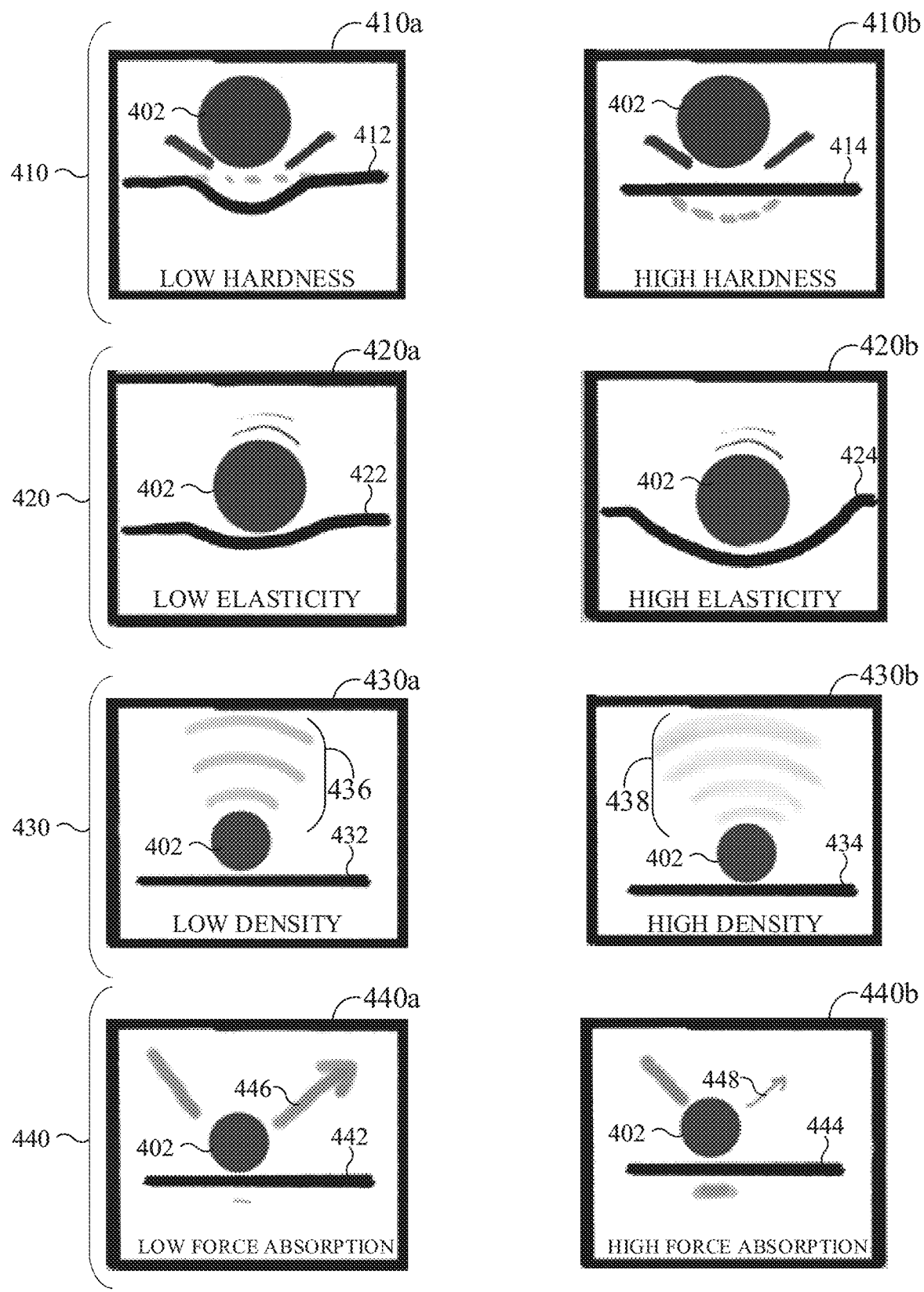
FIG. 4 illustrates example properties associated with a physical object in accordance with this disclosure.

FIG. 4 illustrates example properties associated with a physical object in accordance with this disclosure. The embodiments shown in FIG. 4 are for illustration only. Other embodiments can be used without departing from the scope of the present disclosure.

As illustrated, FIG. 4 describes four types of properties including: a hard property 410 representing hardness; an elastic property 420 representing elasticity; a density property 430 representing density; and an absorption property 440 representing force absorption. The four properties are illustrated by an object 402 colliding with a surface, such as surface 412, 414, 422, 424, 432, 434, 442, and 444, of a physical object with a particular value of one of the properties.

The hard property 410 describe hardness of a physical object. Hardness is a resistance to deformation. A low hardness value 410a indicates that the object is not resistant to deformation under the weight and force of other objects. In contrast, a high hardness value 410b indicates that the object surface is resistant to deformation under the weight and force of other objects. The hard property 410 describes the weight limit (or magnitude of applied force) before deformation is perceived on the surface of an object. For example, a surface 412 will not show signs of deformation until a weight or force greater than a certain hardness value collides with the surface 412. For instance, the surface of a physical object will not deform until an object with a greater force or weight is applied thereto. In certain embodiments, the virtual object adjustment engine 319 of FIG. 3 can modify the appearance of a physical object by generating and applying an overlay to the object. That is, the virtual object adjustment engine 319 will not generate and apply the overlay, for virtually deforming the physical object, until the virtual object places a virtual weight or virtual force that is greater than certain hardness values, such as threshold or specified, as indicated by the real-world object colliders.

The elastic property 420 describes elasticity of a physical object. Elasticity is the deformability of an objects surface. A value associated with the elastic property 440 defines how much an object tends to deform or curve when the object is being deformed based on the weight or force of another object. For example, a low elasticity value 420a indicates that the surface of the object deforms less than a surface with a high elasticity value 420b. The elastic property 420 modifies the position of the colliding object. In certain embodiments, the virtual object adjustment engine 319 of FIG. 3 can modify the appearance of a virtual object by sinking the virtual object into the physical object based on an elasticity value of the physical object. For example, when the physical object has a high elasticity value 420b, the virtual object adjustment engine 319 modifies the appearance of the virtual object by sinking the virtual object into the physical object. Alternatively, when the physical object has a low elasticity value 420a, the virtual object adjustment engine 319 does not modify the appearance of the virtual object and places the virtual object on top of the physical object.

The density property 430 describes the density of a physical object. Density describes whether the physical object is hollow such that an effect is caused for sound generation of an interaction between the virtual object and the physical object. Based on a force that the virtual object interacts with the physical object, and the density of the physical object, certain sounds can be accessed in a sound library in the information repository 320 of FIG. 3. For example, a physical object with a high density value 430b corresponds to hollow sounds 438 while a low density value 430a corresponds to sharper sounds 436. The sound library can include a spectrum of sounds pertaining to different densities of objects as well as objects of different materials. The force amplitude and the length of the collision between the virtual object and the physical object can correlate to the volume and length of the sound that is produced via the speaker 290.

The absorption property 440 describes force absorption. Force absorption indicates how much the physical object can absorb a force that is applied to the physical object. For example, if a ball bounces on the object, the value associated with property 440 describes how the ball will react after the collision. For example, a low force absorption value 440a indicates that the surface of the object does not absorb the force, such that the velocity of the ball is not dampened due to the collision. In contrast, a high force absorption value 440b indicates that the surface of the object absorbs the force, such that the velocity of the ball is reduced. In certain embodiments, the virtual object adjustment engine 319 of FIG. 3 can modify the how a virtual object reacts when colliding with a physical object. For example, if the physical object has a low force absorption value 440a, then the virtual object adjustment engine 319 can apply an opposite force, equal in amplitude of the colliding force to the virtual object, as the virtual object bounces off of the physical object. In contrast, if the physical object has a high force absorption value 440*b*, then the virtual object adjustment engine 319 can apply an opposite force that is less than the colliding force between the virtual object and the physical object, as the virtual object bounces off of the physical object.

Although FIG. 4 illustrates four example properties associated with an object, various changes may be made to FIG. 4. For example, additional properties can be associated with a physical object.

Figure 5:
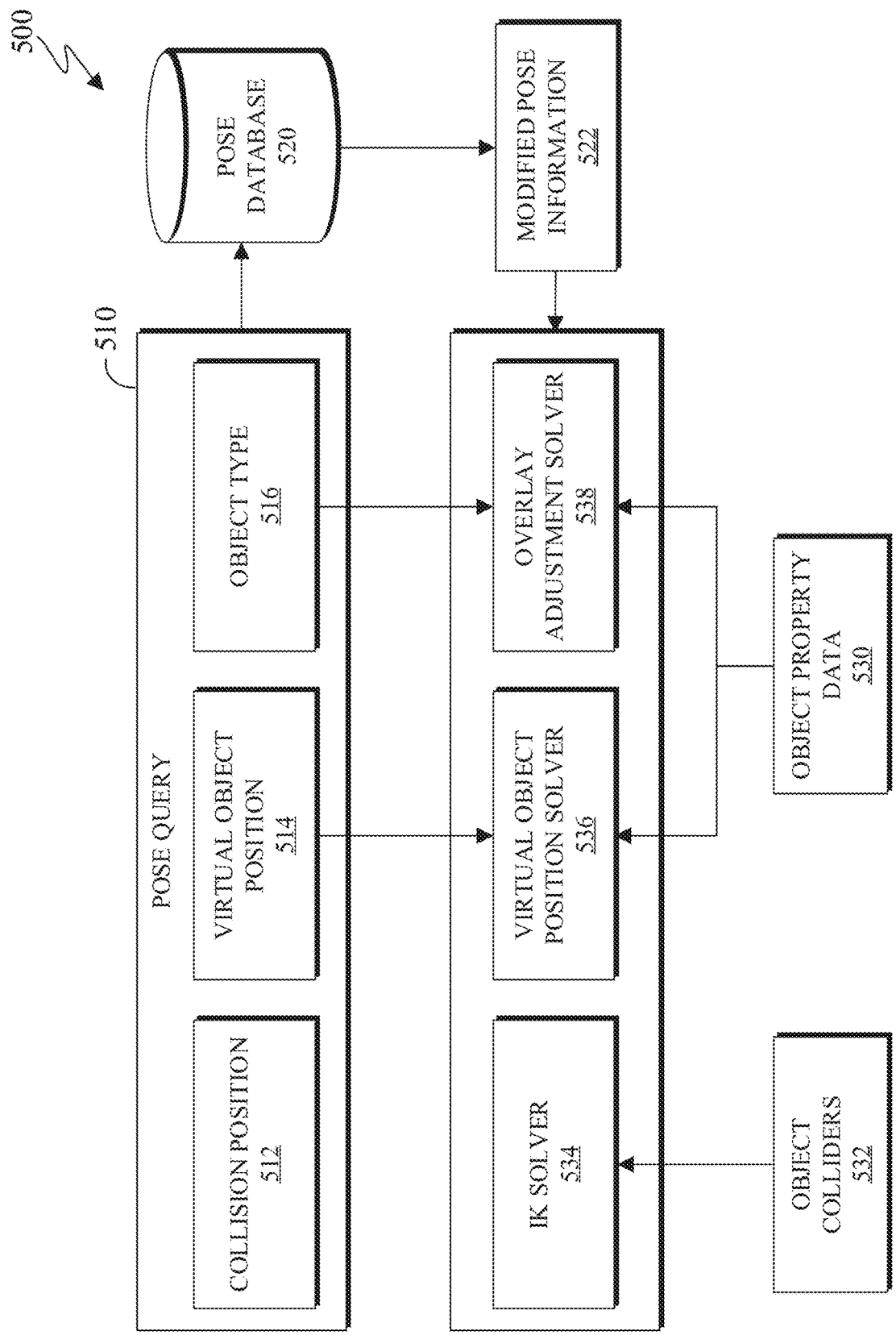
FIG. 5 illustrates an example block diagram for adjusting a pose of an avatar in accordance with this disclosure.

FIG. 5 illustrates an example block diagram 500 for adjusting a pose of an avatar in accordance with this disclosure. The block diagram 500 can be implemented any of the client devices 106-116 or the server 104 of FIG. 1, the electronic device 201 or the server 206 of FIG. 2, or any combination thereof. In certain embodiments, the block diagram 500 is performed by the virtual object adjustment engine 319 of FIG. 3. In other embodiments, the block diagram 500 is performed by a remote electronic device such as the remote electronic device 340.

The electronic device 310 of FIG. 3 compares the location of the virtual object to the location of the identified physical objects in the area. When the virtual object is within a threshold distance from the identified physical objects, and the indication included in the information 332 is received (indicating that the remote user allows the electronic device 310 to modify the virtual object), the electronic device 310 modifies the virtual object to interact with the object. Alternatively, when the virtual object is within a threshold distance from the identified physical objects, and the electronic device 310 receives instructions 334 for manually controlling the virtual object, the electronic device 310 modifies the virtual object to interact with the object.

In certain embodiments, the virtual object interacts with a physical object by modifying a pose of the virtual object, modifying the perception of the physical object, generating a sound corresponding to the interaction, or a combination thereof. Instead of the virtual object intersecting with and overlapping the real world object, the pose of the virtual object is modified to interact realistically with the object accordingly to the object type. For example, to modify the pose of the virtual object, the virtual object can lean against the physical object, sit on the physical object (such as when the physical object is for sitting, such as a chair), climb on the physical object (such as when the physical object is for climbing, such as a step stool), and the like.

As illustrated in the block diagram 500 of FIG. 5, the electronic device 310 performs a pose query 510 to prior to adjusting the pose of the virtual object for interaction with the physical object. That is, when the virtual object is within a threshold distance from the physical object (such as when the virtual object is near or overlapping the physical object), the pose query 510 identifies collision position 512. The collision position 512 is the position of the physical object with respect to the virtual object when the two objects are within a threshold. The pose query 510 also identifies the virtual object position 514. For example, if the virtual object is an avatar, the virtual object position 514 indicates whether the avatar is standing, sitting, laying down, running, jumping, and the like. If the virtual object is a ball, the virtual object position 514 indicates whether the ball is being thrown, rolling, stationary, bouncing, and the like. The pose query 510 further identifies the physical object type via the object recognition such as the object recognition engine 314 of FIG. 3.

Based on the position of the virtual object with respect to the physical object (via the collision position 512), the virtual object position 514, and the object type 516, the electronic device 310 parses through a pose database 520 to select modified pose information. The modified pose information includes pose data for altering the pose of the virtual object, a pose position, a pose mask, and the like. For example, if the virtual object is an avatar, that is standing in the middle of a sofa at the viewers location, the electronic device 310 can select modified pose information 522 that modifies the pose of the avatar from a standing position to a seated position on a cushion of the sofa. For another example, if the virtual object is an avatar that is near a wall, the electronic device 310 can select modified pose information 522 that modifies the hands of the avatar to grab or push against the wall. The modified pose information is provided to the inverse kinematic (IK) solver 534, the virtual object position solver 536, and the overlay adjustment solver 538.

The IK solver 534 obtains the modified pose information 522 and the object colliders 532. The IK solver 534 modifies the joints of the virtual object to perform the modified pose. For example, if the virtual object is an avatar that is standing and the modified pose information indicates that the avatar is to sit, the IK solver 534 modifies the hip and knee joints of the avatar to transition the avatar from the standing position to the seated position.

The virtual object position solver 536 obtains the virtual object position 514 and the object property data 530, such as via the physical properties information 324 of FIG. 3. The virtual object position solver 536 determines how to modify the position of the virtual object based on the property data of the physical object.

The overlay adjustment solver 538, obtains the object type 516 and the object property data 530 and generates a virtual overlay on the physical object. For example, the virtual overlay can include a shadow such as when the virtual object touches the physical object. For another example, the virtual overlay can indicate that the virtual object depresses (sinks) into the object, such as when the properties of the object indicate that the object has a low hardness and a high elasticity. Alternatively, if the properties of the object indicate that the object possesses a high hardness and a low elasticity then the virtual overlay can indicate a shadow such as when the virtual object is placed on top of the physical object. The virtual object when displayed to a viewer appears to realistically interact with the physical object.

Although FIG. 5 illustrates one example block diagram, various changes may be made to FIG. 5. For example, the block diagram 500 could be performed by the electronic device 310 of FIG. 3, the remote electronic device 340 of FIG. 3, or a server such as the server 104 of FIG. 1.

FIGS. 6A-7G illustrate example images of object interaction between a virtual avatar and a physical object in accordance with this disclosure. In particular, the examples shown in FIGS. 6A-6F illustrate a virtual object, interacting with a wall that is located at the viewers location, while the examples shown in FIGS. 7A-7G illustrate a virtual object interacting with a piece of furniture such as a sofa that is located at the viewers location.

Figure 6A:
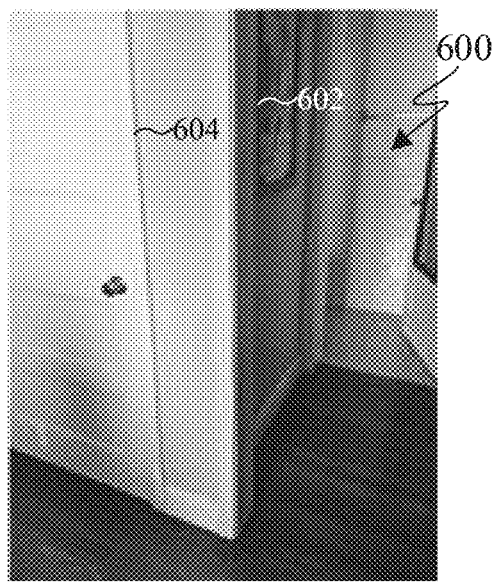
FIGS. 6A-7G illustrate example images of object interaction between a virtual avatar and a physical object in accordance with this disclosure.
Figure 6B:
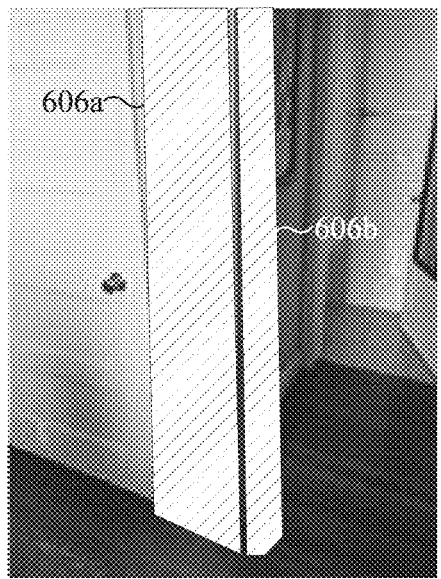
Figure 6C:
Figure 6D:
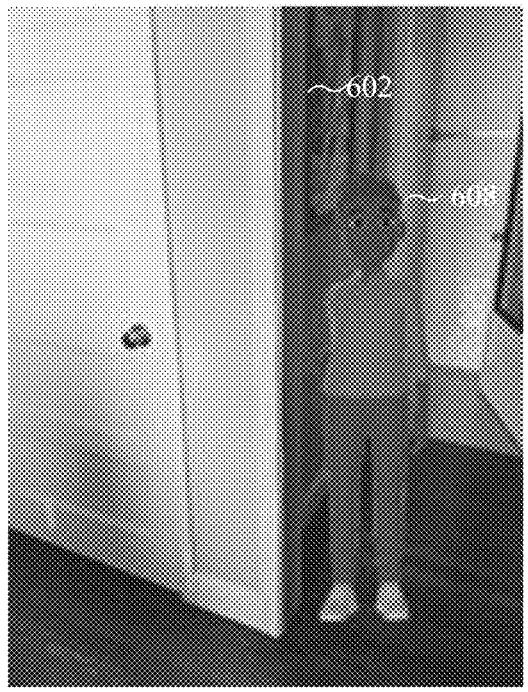
Figure 6E:
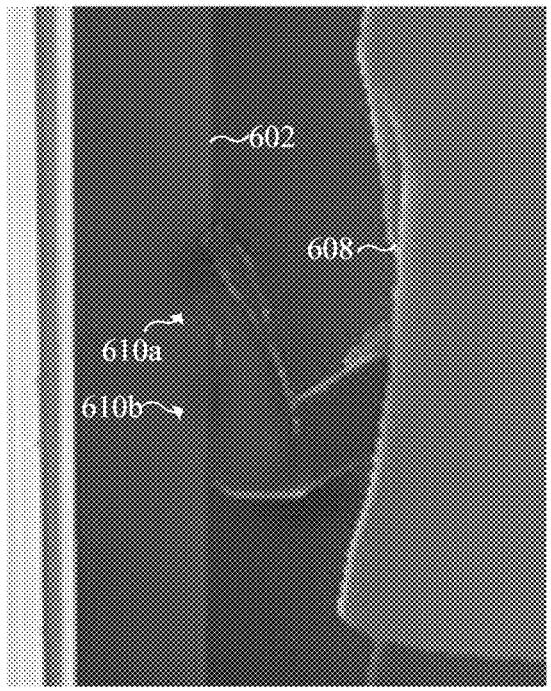
Figure 6F:
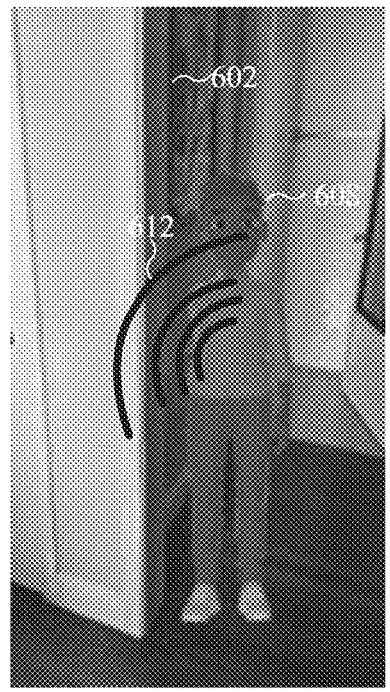

FIG. 6A illustrates a view of an area 600 at a location at the electronic device 310. The area 600 includes a wall 602 and a door 604. FIG. 6B illustrates primitives 606*a* and 606*b* highlighting a portion of the wall 602. For example, the object recognition engine 314 of FIG. 3 identifies the object as a wall and identifies properties associated with it. FIG. 6C illustrates the virtual object, illustrated as an avatar 608 intersecting the wall 602. The virtual object adjustment engine 319 of FIG. 3 can adjust the position and pose of the avatar 608. For example, as illustrated in FIG. 6D, the avatar 608 is moved to the side of the wall 602, so it is not overlapping the wall 602. Additionally, the pose of the avatar 608 is adjusted to show the avatar 608 leaning against the wall 602, as illustrated in FIG. 6D. FIG. 6E illustrates example overlays 610a and 610b. In the examples shown, the overlays 610a and 610b are shadows that are virtually generated and displayed on the wall 602. FIG. 6F graphically illustrates a sound 612 that is generated and played via the speakers when the avatar 608 places its virtual hand against the wall 602.

Figure 7A:
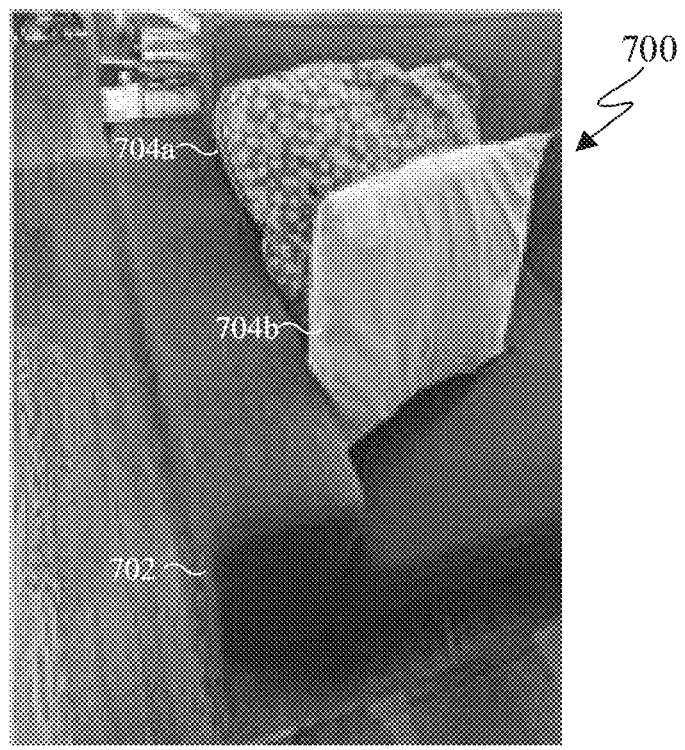
Figure 7B:
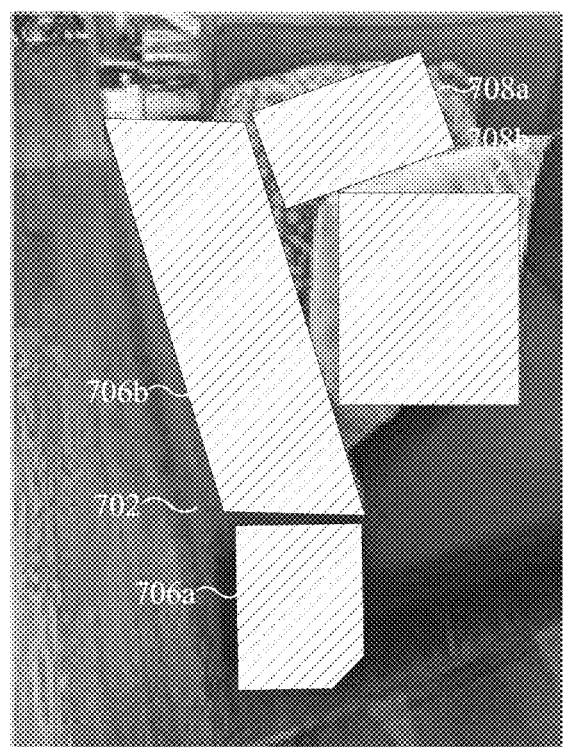
Figure 7C:
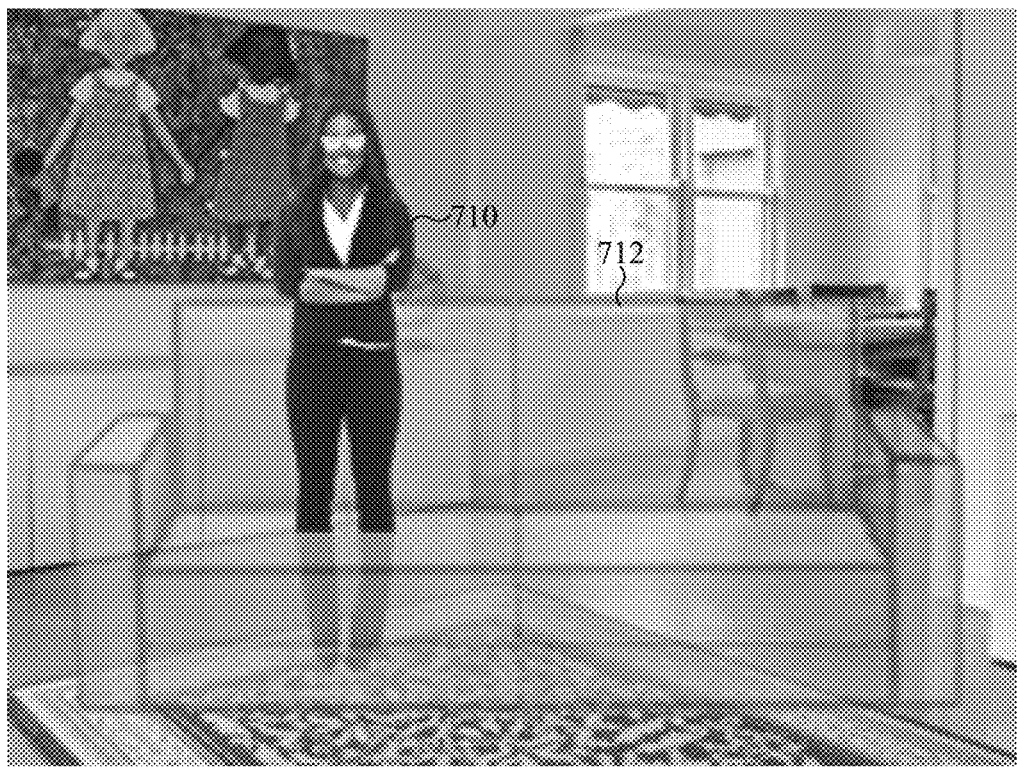
Figure 7D:

FIG. 7A illustrates a view of an area 700 at the location at the electronic device 310. The area 700 includes a sofa 702 and two pillows 704a and 704b. FIG. 7B illustrates primitives 706a, 706b, 708a, and 708b highlighting a portion of the sofa 702 and the two pillows 704a and 704b. For example, the object recognition engine 314 of FIG. 3 identifies the objects as a sofa and pillows. The object recognition engine 314 also identifies various properties associated with the sofa 702 and pillows 704a and 704b, such as hardness, elasticity, density, and the like. FIG. 7C illustrates a view of the remote user 710 at remote location while FIG. 7D illustrates a view of the area 700 of the virtual object representing the remote user, illustrated as an avatar 714. In particular, FIG. 7C illustrates an example view of the remote user 710 with an HMD standing within the collision primitive 712 representing the sofa 702 where the avatar 714 representing the remoter user 710 is positioned. FIG. 7D illustrates a point of view of the viewer viewing the avatar 714 of the remote user 710 standing in the sofa 702 at the location of the viewer.

Figure 7E:
Figure 7F:
Figure 7G:

FIGS. 7E, 7F, and 7G illustrate various modifications representing an interaction between the virtual object and the object based on the properties of the object. The pose of the avatar 714 is adjusted to show the avatar sitting on the sofa 702, at illustrated in FIG. 7E. FIG. 7F illustrates example overlays 716. The overlay 716 includes shadows that are virtually generated and displayed on the pillows 704b. The avatar 714 can be displayed to depress slightly into the sofa 702, the pillows 704a and 704b, or both, based on the properties associated therewith. FIG. 7G illustrates sound 718 that is generated and played via the speakers when the avatar 714 sits in on the sofa 702. The sound 718 can be based on the identified properties of the sofa. As illustrated, the lines representing the sound 718 are fuzzy and wide representing one type of sound while the lines representing the sound 612 of FIG. 6F are thin and sharp representing another type of sound.

Figure 8:
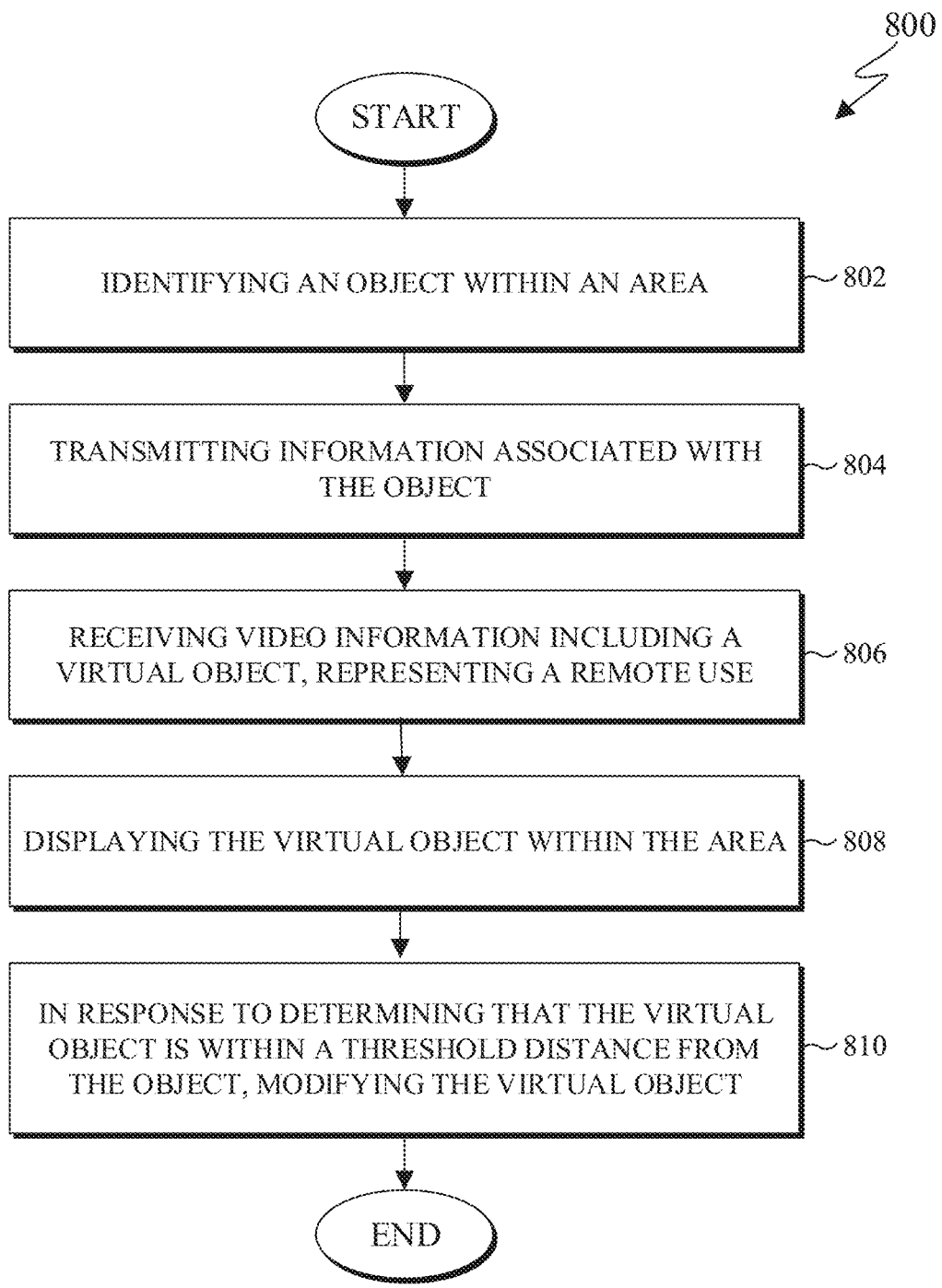
FIG. 8 illustrates an example method for augmented reality object interaction in accordance with this disclosure.

FIG. 8 illustrates an example method 800 for augmented reality object interaction in accordance with this disclosure. The method 800 may be performed by the server 104 or any of the client devices 106-114 of FIG. 1, the electronic device 201 or the server 206 of FIG. 2, or any other suitable device or system. For ease of explanation, the method 800 can be performed by the electronic device 310 of FIG. 3. However, the method 800 can be used with any other suitable system or device.

In block 802, the electronic device 310 identifies an object within an area. For example, the electronic device 310, captures images or videos of the area or obtains the images or videos. The electronic device 310 then performs object recognition for identifying a category or type of object within the area. The electronic device 310 also identifies properties associate with the identified object. The properties can include hardness, elasticity, density, force absorption, and the like. Hardness indications the level of resistance to deformation when another object collides with identified object. Elasticity indicates a level of deformation of the identified object when another object collides with identified object. Density indicates a type of sound that is associated with the identified object when another object collides with identified object. Force absorption indicates a level of force that the identified object absorbs when another object collides with identified object.

In certain embodiments, the electronic device 301 generates object information to be transmitted to a remote electronic device. The object information includes the identified object and properties associated with the object. The object information also includes an indication of a location of the object within the area. The object information can further include primitives around an identified object. The primitives can provide to a remote user a shape of the object.

In block 804, the electronic device 310 transmits the object information to the remote electronic device. The remote electronic device can take the object information and generate a virtual representation of the object at the location of the electronic device 310. In block 806, the electronic device 301 receives from the remote electronic device information. The information can include a virtual object, such as an avatar that represents the remote user. The electronic device 301 can also receive an indication as to whether the electronic device 301 is to modify the virtual object if the virtual object collides or overlaps with a physical object (such as the identified object) at the location viewer. In block 808, the electronic device 310 displays the received virtual object.

In certain embodiments, the virtual object is controlled by a remote user via the remote electronic device. For example, the remote user can move the virtual object within the area of the electronic device 310. The movements of the virtual object can be displayed in real time on a display of the electronic device 310 for the user to view.

In block 810, the electronic device 310 determines that when the virtual object is within a threshold distance from the identified object, the virtual object is modified to interact with the identified object based on the properties associated with the virtual object. For example, if the virtual object is an avatar, the pose of the avatar can be adjusted. For instance, if the object is identified as a chair, the avatar can be adjusted to sit in a chair. If the object is identified as a wall, the avatar can be adjusted to lean against the wall.

In certain embodiments, an overlay is generated and displayed based on the interaction between the virtual object and the identified object. For example, a shadow can be displayed over a part of object based on the location of the virtual object. In another example, an overlay can depict the virtual object sitting on a sofa that depresses slightly based on the virtual object sitting on a plush sofa.

In certain embodiments, a sound is generated based on the interaction between the virtual object and the identified object. The sound is selected based on a property of the object. For example, if the object is metal and dense, a first sound is generated, and if the object is metal and hollow another sound is made.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for augmented reality object interaction comprising:
    identifying a physical object within an area proximate to a user and properties associated with the physical object;
    transmitting, to a remote electronic device, object information associated with the physical object;
    receiving, from the remote electronic device, information including a virtual object representing a remote user;
    displaying the virtual object within the area without overlapping the physical object;
    receiving information for a movement of the remote user for the virtual object;
    determining that the movement of the remote user causes the virtual object to be within a threshold distance from the physical object; and
    in response to determining that the movement of the remote user causes the virtual object to be within the threshold distance from the physical object, modifying the virtual object to interact with the physical object based on the properties of the physical object;
    wherein modifying the virtual object to interact with the physical object comprises adjusting a pose of the virtual object and a position of the virtual object based on the properties of the physical object.

2. The method of claim 1, wherein the properties include at least one of:
    a hardness property indicating a level of resistance of the physical object to deformation when the virtual object interacts with the physical object;
    an elasticity property indicating a level of deformation of the physical object when the virtual object interacts with the physical object;
    a density property indicating a level of sound that is generated when the virtual object interacts with the physical object; or
    a force absorption property indicating a level of force that the physical object absorbs when the virtual object interacts with the physical object.

3. The method of claim 1, further comprising:
    generating the object information associated with the physical object, the object information including (i) at least one predefined shape outlining a perimeter of the physical object, (ii) a location of the physical object within the area, and (iii) the properties associated with the physical object, wherein the at least one predefined shape outlining the perimeter of the physical object provides an indication of a shape of the physical object at the location of the physical object in the area for the remote user;
    receiving, from the remote electronic device, an indication to modify the virtual object; and
    modifying the virtual object within the area based on the indication.

4. The method of claim 1, wherein modifying the virtual object to interact with the physical object further comprises:
    generating a sound effect representing the interaction; and
    displaying a visual indication representing the sound effect at a location of the interaction.

5. The method of claim 1, wherein modifying the virtual object to interact with the physical object further comprises:
    generating an overlay associated with the interaction of the virtual object with the physical object based on the properties of the physical object; and
    displaying the overlay over the physical object.

6. The method of claim 5, further comprising:
    modifying the overlay based on the interaction with the virtual object.

7. The method of claim 1, further comprising:
    generating at least one predefined shape outlining a perimeter of the physical object;
    determining that the virtual object overlaps one of the at least one predefined shape outlining the perimeter of the physical object; and
    identifying the pose of the virtual object based on the position of the virtual object with respect to the physical object and the properties of the physical object,
    wherein modifying the virtual object to interact with the physical object further comprises:
        when the physical object is identified as a wall, modifying the virtual object to lean against the wall based on the identified pose, and
        when the physical object is identified as a seat, modifying the virtual object to sit in the seat based on the identified pose.

8. An electronic device for augmented reality object interaction comprising:
    a communication interface; and
    at least one processor operably connected to the communication interface, the at least one processor configured to:
        identify a physical object within an area proximate to a user and properties associated with the physical object;
        transmit, to a remote electronic device, object information associated with the physical object;
        receive, from the remote electronic device, information including a virtual object representing a remote user;
        display the virtual object within the area without overlapping the physical object;
        receive information for a movement of the remote user for the virtual object;

determine that the movement of the remote user causes the virtual object to be within a threshold distance from the physical object; and in response to determining that the movement of the remote user causes the virtual object to be within the threshold distance from the physical object, modify the virtual object to interact with the physical object based on the properties of the physical object;

wherein, to modify the virtual object to interact with the physical object, the at least one processor is configured to adjust a pose of the virtual object and a position of the virtual object based on the properties of the physical object.

9. The electronic device of claim 8, wherein the properties include at least one of:

a hardness property indicating a level of resistance of the physical object to deformation when the virtual object interacts with the physical object;

an elasticity property indicating a level of deformation of the physical object when the virtual object interacts with the physical object;

a density property indicating a level of sound that is generated when the virtual object interacts with the physical object; or a force absorption property indicating a level of force that the physical object absorbs when the virtual object interacts with the physical object.

10. The electronic device of claim 8, wherein the at least one processor is further configured to:

generate the object information associated with the physical object, the object information including (i) at least one predefined shape outlining a perimeter of the physical object, (ii) a location of the physical object within the area, and (iii) the properties associated with the physical object, wherein the at least one predefined shape outlining the perimeter of the physical object provides an indication of a shape of the physical object at the location of the physical object in the area for the remote user;

receive, from the remote electronic device, an indication to modify the virtual object; and modify the virtual object within the area based on the indication.

11. The electronic device of claim 8, wherein, to modify the virtual object to interact with the physical object, the at least one processor is further configured to:

generate a sound effect representing the interaction; and display a visual indication representing the sound effect at a location of the interaction.

12. The electronic device of claim 8, wherein, to modify the virtual object to interact with the physical object, the at least one processor is further configured to:

generate an overlay associated with the interaction of the virtual object with the physical object based on the properties of the physical object; and display the overlay over the physical object.

13. The electronic device of claim 12, wherein the at least one processor is further configured to modify the overlay based on the interaction with the virtual object.

14. The electronic device of claim 8, wherein:

the at least one processor is further configured to:

generate at least one predefined shape outlining a perimeter of the physical object, determine that the virtual object overlaps one of the at least one predefined shape outlining the perimeter of the physical object, and identify the pose of the virtual object based on the position of the virtual object with respect to the physical object and the properties of the physical object; and to modify the virtual object to interact with the physical object, the at least one processor is further configured to:

when the physical object is identified as a wall, modify the virtual object to lean against the wall based on the identified pose, and when the physical object is identified as a seat, modify the virtual object to sit in the seat based on the identified pose.

15. A non-transitory machine-readable medium containing instructions that when executed cause at least one processor of an electronic device to:

identify a physical object within an area proximate to a user and properties associated with the physical object;

transmit, to a remote electronic device, object information associated with the physical object;

receive, from the remote electronic device, information including a virtual object representing a remote user;

display the virtual object within the area without overlapping the physical object;

receive information for a movement of the remote user for the virtual object;

determine that the movement of the remote user causes the virtual object to be within a threshold distance from the physical object; and in response to determining that the movement of the remote user causes the virtual object to be within the threshold distance from the physical object, modify the virtual object to interact with the physical object based on the properties of the physical object;

wherein the instructions that when executed cause the at least one processor to modify the virtual object to interact with the physical object comprise instructions that when executed cause the at least one processor to adjust a pose of the virtual object and a position of the virtual object based on the properties of the physical object.

16. The non-transitory machine-readable medium of claim 15, wherein the properties include at least one of:

a hardness property indicating a level of resistance of the physical object to deformation when the virtual object interacts with the physical object;

an elasticity property indicating a level of deformation of the physical object when the virtual object interacts with the physical object;

a density property indicating a level of sound that is generated when the virtual object interacts with the physical object; or a force absorption property indicating a level of force that the physical object absorbs when the virtual object interacts with the physical object.

17. The non-transitory machine-readable medium of claim 15, further containing instructions that when executed cause the at least one processor to:

generate the object information associated with the physical object, the object information including (i) at least one predefined shape outlining a perimeter of the physical object, (ii) a location of the physical object within the area, and (iii) the properties associated with the physical object, wherein the at least one predefined shape outlining the perimeter of the physical object provides an indication of a shape of the physical object at the location of the physical object in the area for the remote user;

receive, from the remote electronic device, an indication to modify the virtual object; and modify the virtual object within the area based on the indication.

18. The non-transitory machine-readable medium of claim 15, wherein the instructions that when executed cause the at least one processor to modify the virtual object to interact with the physical object further comprise instructions that when executed cause the at least one processor to:

generate a sound effect representing the interaction; and display a visual indication representing the sound effect at a location of the interaction.

19. The non-transitory machine-readable medium of claim 15, wherein the instructions that when executed cause the at least one processor to modify the virtual object to interact with the physical object further comprises instructions that when executed cause the at least one processor to:

generate an overlay associated with the interaction of the virtual object with the physical object based on the properties of the physical object; and display the overlay over the physical object.

20. The non-transitory machine-readable medium of claim 19, further containing instructions that when executed cause the at least one processor to modify the overlay based on the interaction with the virtual object.

* * * * *